(12) United States Patent
Anderson et al.

(10) Patent No.: US 6,908,539 B2
(45) Date of Patent: Jun. 21, 2005

(54) CATHODIC ELECTROCOATING COMPOSITION CONTAINING MORPHOLINE DIONE BLOCKED POLYISOCYANATE CROSSLINKING AGENT

(75) Inventors: Albert G. Anderson, Wilmington, DE (US); Allisa Gam, Troy, MI (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 442 days.

(21) Appl. No.: 10/187,502

(22) Filed: Jul. 2, 2002

(65) Prior Publication Data

US 2004/0003995 A1 Jan. 8, 2004

(51) Int. Cl.$^7$ .............................................. C25D 13/10
(52) U.S. Cl. ....................... 204/506; 204/505; 523/415; 528/45
(58) Field of Search ................................ 204/506, 505; 523/415; 528/45

(56) References Cited

U.S. PATENT DOCUMENTS

| | | | |
|---|---|---|---|
| 2,723,247 A | 11/1955 | Harrington | |
| 4,118,422 A | 10/1978 | Klein | |
| 4,419,467 A | 12/1983 | Wismer et al. | |
| 4,615,779 A | 10/1986 | McCollum et al. | |
| 4,684,702 A | 8/1987 | Paar et al. | |
| 4,719,253 A | 1/1988 | Turpin et al. | |
| 4,931,501 A | 6/1990 | Lai et al. | |
| 5,431,791 A | 7/1995 | December et al. | |
| 6,583,223 B2 * | 6/2003 | Goetz et al. | ................... 525/88 |

FOREIGN PATENT DOCUMENTS

| | | |
|---|---|---|
| EP | 0 371 640 A1 | 6/1990 |
| TW | 216804 | 8/1992 |

OTHER PUBLICATIONS

Ulrich T. Mueller–Westerhoff et al., Alpha–diones from cyclic oxamides and organolithium reagents: A new, general and environmentally beneficial synthetic method, Dep. Chem., Univ. Connecticut, Storrs, CT, USA. Synlett (1994), 975–84.

International Search Report (PCT/US 03/21246) Dated Mar. 11, 2003.

* cited by examiner

Primary Examiner—Kishor Mayekar
(74) Attorney, Agent, or Firm—Steven C. Benjamin

(57) ABSTRACT

An improved aqueous cathodic electrocoating composition having a binder of an epoxy-amine adduct and a polyisocyanate crosslinking agent; wherein the improvement is the use of a polyisocyanate crosslinking agent having at least one crosslinkable morpholine dione group per molecule. Electrodeposited finishes are formed that have reduced volatile emissions and film weight loss when heated to cure.

12 Claims, No Drawings

CATHODIC ELECTROCOATING COMPOSITION CONTAINING MORPHOLINE DIONE BLOCKED POLYISOCYANATE CROSSLINKING AGENT

BACKGROUND OF THE INVENTION

This invention is directed to a cathodic electrocoating composition and in particular to a cathodic electrocoating composition containing a morpholine dione crosslinking agent which significantly reduces volatile emissions and bake-off loss that occur from the coating film during curing.

The coating of electrically conductive substrates by an electrodeposition process, also called an electrocoating process, is a well known and important industrial process. Electrodeposition of primers on metal automotive substrates is widely used in the automotive industry. In this process, a conductive article, such as an autobody or an auto part, is immersed in a bath of a coating composition of an aqueous emulsion of film forming polymer and the article acts as an electrode in the electrodeposition process. An electric current is passed between the article and a counter-electrode in electrical contact with the coating composition until a coating of a desired thickness is deposited on the article. In a cathodic electrocoating process, the article to be coated is the cathode and the counter-electrode is the anode.

Film forming resin compositions used in the bath of a typical cathodic electrodeposition process also are well known in the art. These resins typically are made from polyepoxide resins which have been chain extended and then an adduct is formed to include amine groups in the resin. Amine groups typically are introduced through a reaction of the resin with an amine compound. These resins are blended with a crosslinking agent, usually a polyisocyanate, and then neutralized with an acid to form a water emulsion which is usually referred to as a principal emulsion.

The principal emulsion is combined with a pigment paste, coalescent solvents, water, and other additives such as a catalyst to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics of the tank, the immersion time, and the like.

The resulting coated article is removed from the bath and is rinsed with deionized water. The coating on the article is cured typically in an oven at sufficient temperature to form a crosslinked finish on the article. The presence of the catalyst enhances the crosslinking of the finish. Cathodic electrocoating compositions, resin compositions, coating baths and cathodic electrodeposition processes are disclosed in Jarabek, et al. U.S. Pat. No. 3,922,253 issued Nov. 25, 1975; Wismer, et al. U.S. Pat. No. 4,419,467 issued Dec. 6, 1983; Belanger U.S. Pat. No. 4,137,140 issued Jan. 30, 1979 and Wismer, et al. U.S. Pat. No. 4,468,307 issued Aug. 25, 1984.

One disadvantage associated with conventional electrocoating compositions containing polyisocyanate crosslinking agents is that in order to prevent premature gelation of the electrocoating composition, the highly reactive isocyanate groups on the curing agent must be blocked, for example, with an alcohol. Blocked polyisocyanates, however, require high temperatures to unblock and begin the curing reaction. This curing mechanism also releases a substantial amount of volatile blocking agents during curing, which generates unwanted film weight losses, also known as bake-off loss, and makes it necessary to purify the exhaust air discharged from the oven and constitutes an unwanted loss in resin solids. In addition, the volatile blocking agents released during cure can cause other deleterious effects on various coating properties, e.g., producing a rough film surface.

U.S. Pat. No. 4,615,779 to McCollum, et al. issued Oct. 7, 1986 suggests the use of lower molecular weight alcohol blocking agents to reduce weight loss when the film is heated to cure. Such blocking agents, however, can produce undesirable film defects. U.S. Pat. No. 5,431,791 to December, et al, issued Jul. 11, 1995 describes the use of a curing agent having a plurality of cyclic carbonate groups, in place of blocked polyisocyanates, which still provides desirable urethane crosslinks but is able to avoid bake-off losses and other problems that accompany the use of blocked polyisocyanate curing agents. Cyclic carbonates, however, are oftentimes difficult to incorporate into the principal emulsion.

Therefore, there is still a need to find new cross-linking agents for cathodic electrocoating compositions that reduce volatile emissions and bake-off losses, while maintaining the desired coating properties. There is also a need to find new cross-linking agents of the forgoing character that can be simply and inexpensively prepared on a commercial scale.

SUMMARY OF THE INVENTION

The invention is directed to an improved aqueous cathodic electrocoating composition having a film forming binder of an epoxy-amine adduct, a crosslinking agent for the epoxy-amine adduct and an organic or inorganic acid as the neutralizing agent for the epoxy-amine adduct; wherein the improvement is the use of a blocked polyisocyanate crosslinking agent that has, on an average basis, at least one isocyanate group blocked with a morpholine dione compound for reduced bake-off loss on cure. A standard blocking agent is also preferably used to provide a highly crosslinked final film network.

Methods for cathodically electrocoating a conductive substrate using any of the above-described compositions and conductive articles coated therewith also form part of this invention.

DETAILED DESCRIPTION OF THE INVENTION

The electrocoating composition of this invention is an aqueous composition preferably having a solids content of about 5–50% by weight of a principal emulsion of a cathodic film forming binder, additives, pigment dispersant resins, pigments and the like and usually contains an organic coalescing solvent.

The film forming binder of the principal emulsion used to form the cathodic electrocoating composition of this invention is an epoxy-amine adduct and a novel morpholine dione group containing crosslinking agent. The epoxy-amine adduct is usually formed from an epoxy resin which preferably is chain extended and then reacted with an amine to provide an adduct with amine groups that are subsequently neutralized with an acid. The epoxy-amine adduct usually is blended with the crosslinking resin and then neutralized with an acid and inverted into water to form an aqueous emulsion, which is referred to as the principal emulsion. Other ingredients are then added to the principal emulsion, such as pigment in the form of a pigment paste, coalescent solvents, anticrater agent, flexibilizers, defoamers, wetting agents, and other additives, such as catalyst, to form a commercial electrocoating composition. Typical aqueous cathodic electrocoating compositions are shown in DeBroy, et al. U.S. Pat. No. 5,070,149 issued Dec. 3, 1991 and the aforementioned U.S. Pat. Nos. 3,922,253; 4,419,467; 4,137,140 and 4,468,307.

The advantage of the electrocoating composition of this invention formulated with the novel morpholine dione crosslinking agent is that there is reduced volatile emission and reduced bake-off loss, i.e., weight loss, occurring from the film during cure after electrodeposition. In addition, the electrocoating composition exhibits lower curing temperature and better edge corrosion resistance in comparison to electrocoating compositions that contain conventional alcohol-blocked polyisocyanate crosslinking agents.

The epoxy-amine adduct of the novel composition is formed of an epoxy resin which preferably is chain extended and then reacted with an amine. The resulting epoxy-amine adduct has reactive hydroxyl, epoxy and amine groups.

The epoxy resin used in the epoxy amine adduct is a poly epoxy-hydroxy-ether resin having an epoxy equivalent weight of about 150–2,000.

Epoxy equivalent weight is the weight of resin in grams which contain one gram equivalent of epoxy.

These epoxy resins can be any epoxy-hydroxy containing polymer having a 1,2-epoxy (i.e., terminal) equivalency of two or more per molecule, that is, a polyepoxide which has on an average basis two or more epoxy groups per molecule. Preferred are polyglycidyl ethers of cyclic polyols. Particularly preferred are polyglycidyl ethers of polyhydric phenols such as bisphenol A. These polyepoxides can be produced by etherification of polyhydric phenols with epihalohydrin or dihalohydrin such as epichlorohydrin or dichlorohydrin in the presence of alkali. Examples of polyhydric phenols are 2,2-bis-(4-hydroxyphenyl)ethane, 2-methyl-1,1-bis-(4-hydroxyphenyl)propane, 2,2-bis-(4-hydroxy-3-tertiarybutylphenyl)propane, 1,1-bis-(4-hydroxyphenol)ethane, bis-(2-hydroxynaphthyl)methane, 1,5-dihydroxy-3-naphthalene or the like.

Besides polyhydric phenols, other cyclic polyols can be used in preparing the polyglycidyl ethers of cyclic polyol derivatives. Examples of other cyclic polyols are alicyclic polyols, particularly cycloaliphatic polyols, such as 1,2-bis(hydroxymethyl)cyclohexane, 1,3-bis-(hydroxymethyl) cyclohexane, 1,2-cyclohexane diol, 1,4-cyclohexane diol and hydrogenated bisphenol A.

The epoxy resin can be chain extended, for example, with any of the aforementioned polyhydric phenols. Preferred chain extenders are bisphenol A and ethoxylated bisphenol A and preferably a combination of these phenols. Also, the polyepoxides can be chain extended with a polyether or a polyester polyol which enhances flow and coalescence. Typical useful chain extenders are polyols such as polycaprolactone diols, such as Tone 200® series available from Union Carbide/Dow Corporation, and ethoxylated bisphenol A, such as SYNFAC 8009® available from Milliken Chemical Company.

Examples of polyether polyols and conditions for chain extension are disclosed in U.S. Pat. No. 4,468,307. Examples of polyester polyols for chain extension are disclosed in Marchetti et al U.S. Pat. No. 4,148,772 issued Apr. 10, 1979.

Typical catalysts that are used in the formation of these polyepoxy hydroxy ether resins are tertiary amines such as dimethylbenzylamine and organometallic complexes such as ethyl or other alkyl triphenyl phosphonium iodide.

Ketimines and/or secondary amines and/or primary amines can be used to cap, i.e., react with the epoxy end groups of the resin to form the epoxy amine adduct. Ketimines, which are latent primary amines, are formed by reacting ketones with primary amines. Water formed in the reaction is removed, for example, by azeotropic distillation. Useful ketones include dialkyl, diaryl, and alkylaryl ketones having 3–13 carbon atoms. Specific examples of ketones used to form these ketimines include acetone, methyl ethyl ketone, methyl n-butyl ketone, methyl isobutyl ketone, methyl isoamyl ketone, methyl aryl ketone, ethyl isoamyl ketone, ethyl amyl ketone, acetophenone, and benzophenone. Suitable diamines are ethylenediamine, 1,3-diaminopropane, 1,4-diaminobutane, 1,6-diaminohexane, 4,9-dioxododecane and 1,1,2-dodecanediamine and the like. One typically useful ketimine is diketimine which is the ketimine of diethylene triamine and methyl isobutyl ketone.

Typically useful primary and secondary amines that can be used to form the epoxy-amine adduct are methylamine, ethylamine, propylamine, butylamine, isobutylamine, benzylamine and the like; and dimethylamine, diethylamine, dipropylamine, diisopropylamine, dibutylamine and the like. Alkanol amines are preferred, such as ethanolamine, propanolamine, and the like; and methylethanolamine, ethylethanolamine, phenylethanolamine, diethanolamine and the like. Other amines that can be used are set forth in the aforementioned U.S. Pat. No. 4,419,467 which is hereby incorporated by reference.

It has been discovered that amine groups react with the morpholine dione crosslinking groups employed in this invention.

The cathodic binder of the electrocoating composition contains about 20–80% by weight of the forgoing epoxy amine adduct and correspondingly 80–20% of the novel blocked polyisocyanate crosslinking agent.

The novel blocked polyisocyanate crosslinking agents employed in the coating composition of this invention are organic polyisocyanates that have been pre-reacted, at least in part, with blocking agents that do not contribute substantially to weight loss when the film is heated to cure. The crosslinking agents of this invention are also preferably fully blocked or capped with the desired blocking agents, so that virtually no free isocyanate groups remain and the resultant blocked or capped isocyanate is stable to active hydrogens at room temperature but reactive with active hydrogen at the desired elevated temperatures.

The polyisocyanates which are used to form the crosslinking agent are organic polyisocyanates. These can be any suitable aliphatic, cycloaliphatic, or aromatic polyisocyanates, or derivatives thereof. Diisocyanates are generally preferred, although higher polyisocyanates, such as triisocyanates can also be used. Examples of suitable aliphatic diisocyanates are straight chain aliphatic diisocyanates such as 1,4-tetramethylene diisocyanate and 1,6-hexamethylene diisocyanate and the like. Also, cycloaliphatic diisocyanates can be employed. Examples include isophorone diisocyanate and 4,4'-methylene-bis-(cyclohexyl isocyanate) and the like. Examples of aromatic diisocyanates are p-phenylene diisocyanate, methylene diphenyl diisocyanate, polymeric methylene diphenyl diisocyanate, and 2,4- or 2,6-toluene diisocyanate and the like. Suitable isocyanate derivatives include 4,4'-methylene dianiline diisocyanate or derivatives thereof wherein the methylene groups are replaced by heteroatoms such as $NCH_3$, S, O, $C(CH_3)_2$, and the like. Examples of some higher polyisocyanates such as triisocyanates are methylene triphenyl triisocyanate, 1,3,5-benzene triisocyanate, 2,4,6-toluene triisocyanate, and the like. Besides the polyisocyanates listed above, other higher polyisocyanates such as isocyanate prepolymers can also be used. These are formed from an organic polyisocyanate and a polyol. Any of the aforementioned polyisocyanates can be used with a polyol. Polyols such as trimethylol alkanes like trimethylol propane or ethane can be used. Polymeric polyols such as polycaprolactone diols and triols can also be used. Aromatic diisocyanates, however, such as methylene diphenyl diisocyanate, are generally most preferred.

The primary blocking agent which is used to form the crosslinking agent of this invention is one which does not contribute substantially to weight loss, i.e., bake-off loss, when the film is heated to cure. More specifically, the blocking agent used herein is a morpholine dione blocking agent which contains at least one crosslinkable morpholine dione blocking group. During heating, it is believed that the morpholine dione blocking groups, instead of leaving the film, participate in the crosslinking reaction by reacting with the amine groups, i.e., the crosslinking functionality, on the film-forming epoxy-amine resin, and become a permanent part of the final film network. This reaction occurs at relatively low temperatures and no volatile by-products are released, since a ring-opening reaction is involved. Accordingly, this type of curing mechanism reduces bake-off loss and does not contribute to weight loss when the film is heated to cure. This type of curing mechanism also enables the electrocoat composition of this invention to be cured at significantly lower temperatures than traditional electrocoat compositions, which can provide significant energy savings for automotive assembly plants.

A wide variety of hydroxy-functional morpholine dione monomers can be used to introduce such crosslinkable morpholine dione blocking groups into the polyisocyanate molecule. These blocking agents can be any hydroxy-functional morpholine dione monomer having at least one reactive hydroxyl group and at least one morpholine dione group per molecule. Preferred are N- or 4-substituted hydroxy alkyl morpholine dione monomers with 1–8 carbon atoms, preferably 1–4 carbon atoms, in the alkyl group. These monomers are simply, efficiently and inexpensively produced by reacting a dialkyl oxalate, such as diethyl oxalate, with an appropriate polyhydric secondary amine having at least two reactive hydroxyl groups per molecule, such as a dialkanolamine. The reaction is preferably carried out in polar solvent at low temperatures, e.g., 0 to 5° C. The compound obtained is then purified by an appropriate technique depending on its nature to remove alcohol formed in the reaction and any traces of unreacted starting materials. Typically useful secondary amines which can be used to form the hydroxy functional morpholine dione monomer are dialkanol amines, such as those having 1–8 carbon atoms, preferably 1–4 carbon atoms, in the alkanol group, of which diethanolamine is most preferred. Examples of dialkyl oxalate esters are those having about 1 to 15 carbon atoms, preferably 1 to 2 carbon atoms in the alkyl group, of which diethyl oxalate is most preferred.

One preferred class of hydroxy-functional morpholine dione monomers that can be used as a blocking agent in the present invention is represented by the following structural formula:

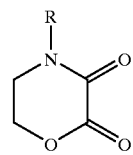

where R is selected from the group consisting of alkanols, preferably lower alkanols having 8 or less, preferably 4 or less, carbon atoms in the alkanol group, of which hydroxyethyl is most preferred.

Other hydroxy functional morpholine dione monomers that can be used are set forth in Klein U.S. Pat. No. 4,118,422 issued Oct. 3, 1978 and Harrington U.S. Pat. No. 2,723,247 issued Nov. 8, 1955, both hereby incorporated by reference.

The blocked polyisocyanates of this invention can be fully blocked (i.e., 100% blocked or as close to 100% as can be reasonably achieved) with these hydroxy-functional morpholine dione monomers as described above, leaving substantially no unreacted isocyanate groups remaining. However, in the present invention, a mixture of blocking agents is generally preferred. Accordingly, the reaction conditions are preferably chosen so that 10–100 mol. % of the polyisocyanate groups are reacted and converted to morpholine dione groups and correspondingly 90–0 mol. % of the polyisocyanate groups can be reacted with conventional isocyanate blocking agents. Examples of conventional blocking agents are ether alcohols, alkyl alcohols, oximes, amides or any compound with active hydrogen, of which a low molecular weight ether or alkyl alcohol which does not contribute substantially to weight loss upon curing is preferred. By low molecular weight, it is meant that the other blocking agent desirably has a number average molecular weight below about 162. In the present invention, the additional blocking agents are used to enable at least some of the isocyanate groups to unblock upon heating and react with any of the remaining active hydrogen groups present in the resin system. Upon heating, these blocking agents separate, thereby providing a reactive isocyanate and additional crosslinking occurs with the epoxy-amine adduct.

Typically useful alkyl alcohol blocking agents are aliphatic, cycloaliphatic or aromatic alkyl monoalcohols having 1–20, preferably 12 or less carbon atoms in the alkyl group, for example, methanol, ethanol, n-propanol, butanol, 2-ethyl hexanol, cyclohexanol, cyclooctanol, phenol, pyridinol, thiophenol, and cresol. Typical ether alcohols that can be used are ethylene glycol mono alkyl ether, diethylene glycol mono alkyl ether, propylene glycol mono alkyl ether or dipropylene glycol mono alkyl ether with alkyl group of 1–10 carbon atoms, for example, diethylene glycol mono butyl ether, ethylene glycol butyl ether, diethylene glycol mono methyl ether, ethylene glycol methyl ether, dipropylene glycol mono methyl ether, dipropylene glycol mono butyl ether, propylene glycol mono butyl ether, propylene glycol mono methyl ether. Typical oximes are methyl ethyl ketone oxime, methyl isobutyl ketone oxime, methyl isoamyl ketone oxime, methyl n-amyl ketone oxime, cyclohexanone oxime, diisobutyl ketone oxime. Typical amides that can be used as blocking agents are caprolactam, methylacetamide, succinimide, acetanilide. One preferred mixture of blocking agents is 4(2-hydroxyethyl)morpholine-2,3-dione and diethylene glycol mono methyl ether.

The resulting polyisocyanate curing agent is therefore provided with a useful amount of crosslinkable morpholine dione groups which do not contribute to weight loss when the film is heated to cure. Most preferably, a blocked isocyanate partially blocked with conventional blocking agent and also possessing reactive morpholine dione groups is provided.

One preferred class of morpholine dione compounds useful as the cross-linking agent in the present invention are morpholine dione polyisocyanate oligomers represented by the following structural formula:

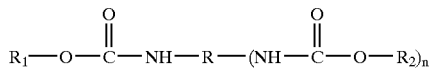

where R represents an aromatic, cycloaliphatic, or aliphatic hydrocarbon radical, preferably an aromatic methylene diphenyl radical, $R_1$ is either a conventional polyisocyanate blocking agent such as an aliphatic monoalcohol, ether alcohol or $R_2$, $R_2$ is a morpholine dione radical represented by the formula:

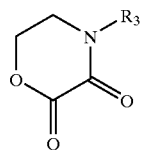

where $R_3$ is an alkyl group having 1–8 carbon atoms, preferably 1–4; and n is a positive integer from 1–4, preferably n is 1.

The blocked polyisocyanate crosslinking agent described above can be prepared by several different approaches, as will appreciated by those skilled in the art. The preferred process for preparing such compounds is by stepwise reaction of the selected polyisocyanate with hydroxy-functional morpholine dione monomer and optional, but preferable, additional blocking agent. This reaction is preferably carried out at elevated temperature in the presence of an inert solvent such as methyl isobutyl ketone and suitable catalyst such as dibutyl tin dilaurate until all of the isocyanate groups are reacted as indicated by infrared scan.

Typical catalysts that can be used in the formation process are conventional tin catalysts, of which dibutyltin dilaurate is preferred.

Typical solvents that can be used in the formation process are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, esters, acetates and mixture of any of the above. Polar solvents such as ethanol, butanol and the like may also be used to reduce viscosity of reaction mixture.

The blocked polyisocyanates of this invention also preferably have a number average molecular weight less than about 2,000, more preferably less than about 1,500 in order to achieve high flowability and high film smoothness. A preferred range for the number average molecular weight is between 400 and 1,200. All molecular weights disclosed herein are determined by gel permeation chromatography using a polystyrene standard.

As indicated above, these compounds are preferably stable to active hydrogens at room temperature, as is required for a cathodic electrocoat crosslinking agent, and activated (i.e., ring-opened) during curing at much lower baking temperatures than standard blocked polyisocyanates, preferably between 275° and 325° F. (135°–162.5° C.). By comparison, standard ether alcohol blocked polyisocyanate crosslinking agents are baked nowadays at 330° F. (165.5° C.) or above to unblock the isocyanate and begin the curing reaction.

The resulting morpholine dione compounds are used in the present coating composition in an amount varying from about 10–60%, preferably about 15–40%, by weight of the total binder in the composition. Most preferably, about 20–30% by weight of such a morpholine dione compound is included in the binder.

Besides the morpholine dione compounds derived from polyisocyanate resins as described above, other morpholine dione crosslinking compounds can also be used in the present invention, as will be appreciated by those skilled in the art.

Optionally, the present coating composition may further contain an additional crosslinking agent, in conjunction with the morpholine dione crosslinking agent. The additional crosslinking agent may comprise 0 to 99% by weight of the total crosslinking component used in the present coating composition. The additional crosslinking agent is also used to react with any remaining active hydrogen groups present in the resin system. Examples of additional crosslinking agents include any of the conventionally known blocked polyisocyanate crosslinking agents. These are aliphatic, cycloaliphatic and aromatic isocyanates such as hexamethylene diisocyanate, cyclohexamethylene diisocyanate, toluene diisocyanate, methylene diphenyl diisocyanate and the like. Aromatic diisocyanates such as methylene diphenyl diisocyanate are preferred. These isocyanates are pre-reacted with a blocking agent such as oximes, alcohols, or caprolactams, such as those listed above, which block the isocyanate functionality. One preferred mixture of blocking agents is methanol, ethanol and diethylene glycol monobutyl ether. Upon heating the blocking agents separate, thereby providing a reactive isocyanate group and additional crosslinking occurs with the epoxy-amine adduct. Isocyanate crosslinkers and blocking agents are well known in the art and also are disclosed in Marchetti et al U.S. Pat. No. 4,419,467 issued Apr. 10, 1979, hereby incorporated by reference. Melamine crosslinking agents could also be used.

The cathodic binder of the epoxy amine adduct and the crosslinking agent(s) are the principal resinous ingredients in the electrocoating composition and are usually present in amounts of about 30 to 50% by weight of solids of the composition. The basic groups (amine groups) of the cathodic binder are partially or totally neutralized with an acid to form a water soluble product. Typical acids used to neutralize the epoxy-amine adduct to form water-dispersible cationic groups are lactic acid, acetic acid, formic acid, sulfamic acid, alkane sulfonic acids such as methanesulfonic acids, ethanesulfonic acid, propanesulfonic acid and the like. Alkane sulfonic acids are generally preferred. The degree of neutralization depends upon the properties of the binder employed in each individual case. In general, sufficient acid is added to provide the resulting electrocoating composition with a pH of about 5.5–8.0. To form an electrocoating bath, the solids of the electrocoating composition are generally reduced with an aqueous medium to the desired bath solids.

Besides the binder resin ingredients described above, the electrocoating composition usually contains pigment which is incorporated into the composition in the form of a pigment paste. The pigment paste is prepared by grinding or dispersing a pigment into a grinding vehicle with curing catalyst and other optional ingredients such as anticratering agents wetting agents, surfactants, and defoamers. Any of the pigment grinding vehicles that are well known in the art can be used. Typically, grinding is done using conventional equipment known in the art such as an Eiger mill, Dynomill or sand mill. Generally grinding is carried out for about 2 to 3 hours until a minimum of 7 or greater Hegman reading is obtained.

Viscosity of the pigment dispersion before it is ground or milled is important. B Brookfield viscosity typically is used as determined in accordance with ASTM D-2196. While the desired viscosity will vary with the selected components, viscosity generally will be in the range of 8000 centipoise to 1500 centipoise (0.8Pa.s to 1.5 Pa.s) to achieve a fine grind during grinding. Viscosity typically increases during grinding and is readily adjusted by modifying the amount of water present.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 5:1, more preferably less than 4:1, and usually about 2 to 4:1. Higher pigment to binder weight ratios have been found to adversely affect coalescence and flow.

The electrocoating compositions of the invention can contain optional ingredients such as wetting agents, surfactants, defoamers and the like. Examples of surfactants and wetting agents include alkyl imidazolines such as those available from Ciba-Geigy Industrial Chemicals as Amine C®, acetylenic alcohols available from Air Products and Chemicals as Surfynol 104®. These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

Curing catalysts such as tin are usually present in the composition. Examples are dibutyltin dilaurate and dibutyltin oxide. When used, they are typically present in amounts of about 0.05 to 2 percent by weight tin based on the weight of total resin solids.

The electrocoating compositions of this invention are dispersed in an aqueous medium. The term "dispersion" as used within the context of this invention is believed to be a two-phase translucent or opaque aqueous resinous binder system in which the binder is in the dispersed phase and water the continuous phase. The average particle size diameter of the binder phase is about 0.05 to 10 $\mu$m, preferably, less than 0.2 $\mu$m. The concentration of the binder in the aqueous medium in general is not critical, but ordinarily the major portion of the aqueous dispersion is water. The aqueous dispersion usually contains from about 3 to 50 percent, preferably 5 to 40 percent, by weight binder solids. Aqueous binder concentrates which are to be further diluted with water when added to an electrocoating bath, generally have a range of binder solids of 10 to 30 percent weight.

Besides water, the aqueous medium of the cathodic electrocoating composition contains a coalescing solvent. Useful coalescing solvents include hydrocarbons, alcohols, polyols, and ketones. Preferred coalescing solvents include monobutyl and monohexyl ethers of ethylene glycol and phenyl ether of propylene glycol. The amount of coalescing solvent is not critical but generally is between 0.1 to 15% by weight, preferably 0.5% by weight, based on the total weight of the aqueous medium.

The electrocoating composition of this invention is used in a conventional cathodic electrocoating process. The electrocoating tank contains two electrically conductive electrodes: the anode which is part of the electrocoating tank and the cathode which is the substrate that is to be coated. This substrate may be any electrically conductive (e.g., metal) object, including but not limited to items such as an auto body or auto part, or any other OEM or industrially coated part, including but not limited to, yard equipment (e.g., lawn mowers, snow blowers, gardening and power tools, and parts therefore), office furniture, household appliances, children's toys, and the like. An adherent film is deposited on the cathode when a sufficient voltage is impressed between the two electrodes. The voltages that are applied may be varied depending on the type of coating and on coating thickness and throw power required and may be as low as 1 volt or as high as several thousand volts. Typical voltages used are between 50–500 volts. The current density usually is between 0.5 and 5 amperes per square foot (4.65 and 46.5 amperes per square meter), and decreases during electrodeposition indicating that an insulating film is being deposited. The immersion time should be sufficient to obtain a cured coating of about 0.5–1.5 mils (10–40 $\mu$m), preferably 0.8–1.2 mils (20–30 $\mu$m). A variety of substrates can be electrocoated with the composition of this invention, such as steel, phosphatized steel, galvanized steel, copper, aluminum, magnesium, and various plastics coated with an electrically conductive coating.

After the coating has been electrocoated, it is cured by baking at elevated temperatures such as 135–200° C. for a sufficient time to cure the coating, typically about 5 to 30 minutes.

In the present invention, at least a portion of the curing reaction is a ring-opening reaction involving the aminolysis of morpholine diones, and releases no volatile by-products. The aminolysis reaction of morpholine diones may be described as an amide forming reaction, which still provides desirable amide crosslinks but is able to avoid significant bake-off losses. Upon curing, the hydroxy groups which are formed in such a reaction may further react with the freed up isocyanate groups on the crosslinker or additional crosslinker, if present, to produce a highly crosslinked network.

The following Examples illustrate the invention. All parts and percentages are on a weight basis unless otherwise indicated. All molecular weights disclosed herein are determined by GPC using a polystyrene standard. Unless otherwise specified, all chemicals and reagents were used as received from Aldrich Chemical Co., Milwaukee, Wis.

EXAMPLES

The following morpholine dione crosslinking oligomer solution was prepared, along with a conventional blocked polyisocyanate crosslinking resin solution, and then principal emulsions and electrocoating compositions were prepared therefrom and the properties of these compositions were compared.

Example 1

Preparation of 4(2-hydroxyethyl)morpholine-2,3-Dione Monomer

A 4(2-hydroxyethyl)morpholine-2,3-dione was prepared by charging 125 g diethyl oxalate and 80 g n-butanol into a suitable reaction vessel and heated to 22° C. under nitrogen blanket. A mixture of 89.9 g diethanolamine and 72 g n-butanol was slowly charged into the reaction vessel while maintaining the reaction mixture below 50° C. After stirring for 30 minutes, the reaction mixture was refluxed for one hour and then allowed to stand at room temperature for 16 hours. The product was collected by filtration and the solid was washed twice with diethyl ether and dried under nitrogen to give 100 g (73.4% yield) of white crystals with 83.3° C.–84.4° C. melting point. IR (Nujol mull) 1759 (ester carbonyl), 1684 (amide carbonyl) cm$^{-1}$. 1H NMR (500 MHz, acetone-d$_6$) δ 4.592 (approx. triplet, 2H, J=5.0 Hz, ring CH$_2$O), 3.903 (approx. triplet, 2H, J=5.0 Hz, ring CH$_2$N), 3.767 (t, 2H, J=5.5 Hz, CH$_2$OH), 3.597 (t, 2H, J=5.5 Hz, chain CH$_2$N). $^{13}$C NMR (500 MHz, D$_2$O) δ158.514 (ester C=O), 155.338 (amide C=O), 67.036 (ring CH$_2$O), 60.399 (CH$_2$OH), 51.034 (ring CH$_2$N), 47.600 (chain CH$_2$N).

Example 2

Preparation of 4(2-hydroxyethyl)morpholine-2,3-dione monomer at lower temperature and higher yield.

A 4(2-hydroxyethyl)morpholine-2,3-dione was prepared at low temperatures by the following procedure. Into a five-necked 22 liter round bottomed flask equipped with a reflux condenser, nitrogen bubbler, addition funnel, thermocouple well, and mechanical stirrer was charged 3000 g (20.53 mol) of diethyl oxalate and 2000 ml of isopropyl alcohol. The solution was cooled to 0 to 5° C. using a cold bath of ice and methanol. A solution of 2160 g (20.53 mol) of diethanolamine dissolved in 2000 ml of isopropyl alcohol was added through the addition funnel during a period of 5 to 6 hours. The reaction is exothermic. After addition was complete, the mixture was allowed to stand at room temperature overnight. The product is collected by filtration. After air drying, 2923 g (89.5% yield) of white crystals were obtained with identical spectral properties to the compound prepared in Example 1.

Example 3

Preparation of Blocked Polyisocyanate Resin With 4(2-Hydroxyethyl) morpholine-2,3-dione and Diethylene Glycol Monobutyl Ether A new blocked polyisocyanate crosslinking resin solution was prepared by charging 338 parts Mondur® MR (methylene diphenyl diisocyanate, from Bayer Corp.), 113 parts methyl isobutyl ketone and 0.07 parts dibutyl tin dilaurate into a suitable reaction vessel and heated to 37° C. under a dry nitrogen blanket. 269 parts diethylene glycol monobutyl ether was slowly charged into the reaction vessel while maintaining the reaction mixture below 93° C. 142 parts 4(2-hydroxyethyl)morpholine-2,3-dione (prepared in Example 1) was then charged into the reaction vessel and kept the reaction temperature below 93° C. The resulting mixture was held at 110° C. until all of the isocyanate was reacted as indicated by infrared scan. 5 parts butanol and 133 parts methyl isobutyl ketone were added to the reaction mixture. The resulting resin solution had a nonvolatile content of 75%.

Example 4

Preparation of Conventional Crosslinking Resin Solution

A dual alcohol blocked polyisocyanate crosslinking resin solution was prepared by charging 317.14 parts Mondur® MR (methylene diphenyl diisocyanate, from Bayer Corp.), 105.71 parts methyl isobutyl ketone and 0.06 parts dibutyl tin dilaurate into a suitable reaction vessel and heated to 37° C. under a nitrogen blanket. A mixture of 189.20 parts diethylene glycol monomethyl ether and 13.24 parts trimethylolpropane was slowly charged into the reaction vessel while maintaining the reaction mixture below 93° C. The reaction mixture was then held at 110° C. until essentially all of the isocyanate was reacted as indicated by infrared scan. 3.17 parts butanol and 64.33 parts methyl isobutyl ketone were then added. The resulting resin solution had a nonvolatile content of 75%.

Example 5

Preparation of Chain Extended Polyepoxide Emulsion with Polyisocyanate Containing 4(2-hydroxyethyl)morpholine-2,3-Dione The following ingredients were charged into a suitable reaction vessel: 512 parts Epon®828 (Epoxy resin of diglycidyl ether of bisphenol A having an epoxy equivalent weight of 188, from Shell), 302 parts bisphenol A, 380 parts ethoxylated bisphenol A having a hydroxyl equivalent weight of 247 (Synfac®8009, from Milliken), 89 parts xylene and 1 part dimethylbenzylamine. The resulting reaction mixture was heated to 160° C. under nitrogen blanket and held at this temperature for one hour. 2 parts dimethylbenzylamine were added and the mixture was held at 147° C. until an epoxy equivalent weight of 1050 was obtained. The reaction mixture was cooled to 149° C. and then 852 parts polyisocyanate resin containing 4(2-hydroxyethyl) morpholine-2,3-dione (prepared in Example 3) was added. At 107° C., 290 parts diketimine (reaction product of diethylenetriamine and methyl isobutyl ketone at 73% nonvolatile content) and 59 parts of methylethanolamine were added. The resulting mixture was held at 120° C. for one hour and then dispersed in an aqueous medium of 1250 parts deionized water and 70 parts methanesulfonic acid (70% methanesulfonic acid in deionized water). It is further diluted with 800 parts deionized water. The emulsion was kept agitated until methyl isobutyl ketone had evaporated. The resulting emulsion had a nonvolatile content of 38%.

Example 6

Preparation of Chain Extended Polyepoxide Emulsion With Conventional Crosslinking Resin Solution The following ingredients were charged into a suitable reaction vessel: 520 parts Epon®828 (Epoxy resin of diglycidyl ether of bisphenol A having an epoxy equivalent weight of 188, from Shell), 151 parts bisphenol A, 190 parts ethoxylated bisphenol A having a hydroxyl equivalent weight of 247 (Synfac® 8009, from Milliken), 44 parts xylene and 1 part dimethylbenzylamine. The resulting reaction mixture was heated to 160° C. under nitrogen blanket and held at this temperature for one hour. 2 parts dimethylbenzylamine were added and the mixture was held at 147° C. until an epoxy equivalent weight of 1050 was obtained. The reaction mixture was cooled to 149° C. and then 797 parts conventional crosslinking resin (prepared in Example 4) was added. At 107° C., 58 parts of diketimine (reaction product of diethylenetriamine and methyl isobutyl ketone at 73% nonvolatile content) and 48 parts of methylethanolamine were added. The resulting mixture was held at 120° C. for one hour and then dispersed in an aqueous medium of 1335 parts deionized water and 61 parts lactic acid (88% lactic acid in deionized water). It was further diluted with 825 parts deionized water. The emulsion was kept agitated until methyl isobutyl ketone had evaporated. The resulting emulsion had a nonvolatile content of 38%.

Example 7

Preparation of Quaternizing Agent

The quaternizing agent was prepared by adding 87 parts dimethylethanolamine to 320 parts 2-ethyl hexanol half-capped toluene diisocyanate in the reaction vessel at room temperature. An exothermic reaction occurred and the reaction mixture was stirred for one hour at 80° C. 118 parts aqueous lactic acid solution (75% nonvolatile content) was then added followed by the addition of 39 parts 2-butoxyethanol. The reaction mixture was held for about one hour at 65° C. with constant stirring to form the quaternizing agent.

Example 8

Preparation of Pigment Grinding Vehicle

The pigment grinding vehicle was prepared by charging 710 parts Epon®828 (Diglycidyl ether of bisphenol A having an epoxide equivalent weight of 188, from Shell) and 290 parts bisphenol A into a suitable vessel under nitrogen blanket and heated to 150° C.–160° C. to initiate an exothermic reaction. The exothermic reaction was continued for about one hour at 150° C.–160° C. The reaction mixture was then cooled to 120° C. and 496 parts of 2-ethyl hexanol half-capped toluene diisocyanate was added. The temperature of the reaction mixture was held at 110° C.–120° C. for one hour, followed by the addition of 1095 parts of 2-butoxyethanol, the reaction mixture was then cooled to 85° C.–90° C. and then 71 parts of deionized water was added followed by the addition of 496 parts quaternizing agent (prepared above). The temperature of the reaction mixture was held at 85° C.–90° C. until an acid value of about 1 was obtained.

Example 9

| Preparation of pigment paste | Parts by Weight |
| --- | --- |
| Pigment grinding vehicle (prepared in Example 8) | 597.29 |
| Deionized water | 835.66 |
| Aluminum silicate pigment | 246.81 |
| Carbon black pigment | 15.27 |
| Dibutyl tin oxide | 164.00 |
| Total | 3000.00 |

The above ingredients were mixed until homogeneous mixture was formed in a suitable mixing container. Then the mixture was dispersed by charging into Eiger mill and then grinding until it pass the Hegman test.

Example 10

| Preparation of Electrocoating Baths | Parts by weight | |
| --- | --- | --- |
| | Bath I | Bath II |
| Emulsion (prepared in Example 5) | 1503.08 | — |
| Emulsion (prepared in Example 6) | — | 1503.08 |
| Deionized water | 2013.49 | 2013.49 |
| Pigment paste (prepared in Example 9) | 397.54 | 397.54 |
| Conventional anti crater agent* | 85.89 | 85.89 |
| Total | 4000.00 | 4000.00 |

*Conventional anti-crater agent is the reaction product of Jeffamine ® D2000 from Huntsman and Epon ® 1001 epoxy resin from Shell.

Cationic electrocoating baths were prepared by mixing the above ingredients. Each bath was then ultrafiltered. Phosphated cold rolled steel panels were electrocoated in each bath at 180–280 volts to obtain a film 0.8–1.0 mils (20.32–25.4 microns) thick on each panel. Each panel was then baked as indicated below to check for proper cure and bake-off loss.

The test used for checking the proper cure of e-coat film at specified baking temperature was by rubbing a cloth soaked in methyl ethyl ketone onto an e-coat film using a minimum of 20 rubs back and forth. The degree of cure can be assessed by examining the cloth for discoloration and by examining the surface of the film for a dull appearance. Dull appearance on an e-coat film or discoloration on the cloth indicated poor cure of e-coat film.

The phosphated cold rolled steel panel coated with Bath I and baked at 320° F. for 10 minutes metal temperature showed no dull appearance. On the other hand, phosphated cold rolled steel panels coated with Bath II baking at the same temperature showed a significant amount of dull appearance.

Another key factor of evaluating e-coat film is the bake-off loss during baking. To determine the percentage bake-off loss during baking, the first step is to deposit the e-coat film on pre-weighed metal panels, the residual water is removed by heating the panels at 105° C. for 3 hours and finally the panels are baked at the specified time and temperature. The percentage bake-off loss of e-coat film is determined by the difference of the weight of e-coat before and after baking divided by the initial weight. For Bath I, the percentage bake-off loss at 360° F. for 10 minutes metal temperature was 11% and for bath II, the percentage bake-off loss at 360° F. for 10 minutes metal temperature is 16%.

The results of these tests are summarized below:

| Results | | |
| --- | --- | --- |
| | Bath I | Bath II |
| Solvent Resistance at 320° F. 10 Min. | No Rub Off (Good Cure) | Dull Appearance (Poor Cure) |
| Bake Off Loss at 360° F. 10 Min. | 11% | 16% |

The above results show that Bath I containing the morpholine dione crosslinking agent had superior crosslinking at lower temperature and lower bake off loss that Bath II containing conventional crosslinking agents.

What is claimed is:

1. An improved aqueous cathodic electrocoating composition comprising a binder of an epoxy-amine adduct, a blocked polyisocyanate crosslinking agent and an organic or inorganic acid as the neutralizing agent for the epoxy-amine adduct; wherein the improvement is the incorporation of a blocked polyisocyanate crosslinking agent that has at least one isocyanate group blocked with a hydroxy-functional morpholine dione blocking agent.

2. The improved electrocoating composition of claim 1 in which the blocked polyisocyanate crosslinking agent is fully blocked with said morpholine dione blocking agent.

3. The improved electrocoating composition of claim 1 in which the blocked polyisocyanate is partially blocked with the morpholine dione blocking agent, with the remaining isocyanate groups being blocked with a conventional isocyanate blocking agent selected from the group consisting of saturated alkyl alcohols, ether alcohols, oximes and amides.

4. The improved electrocoating composition of claim 1 in which the epoxy-amine adduct contains amines selected from the group consisting of primary amines, secondary amines, ketimines, and mixtures thereof.

5. The improved electrocoating composition of claim 1 in which the morpholine dione blocking agent is N-(2-hydroxyethyl)morpholine-2,3-dione.

6. The improved electrocoating composition of claim 1 in which the morpholine dione blocking agent has the general formula:

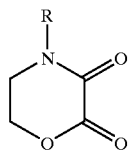

where R is selected from the group consisting of alkanols having 4 or less carbon atoms in the alkanol group.

7. The improved electrocoating composition of claim 1 in which the epoxy adduct comprises a polyepoxy hydroxy ether resin extended with a dihydric phenol and reacted with an amine.

8. The improved electrocoating composition of claim 1, further comprising an additional crosslinking agent, said agent comprising 0 to 99% by weight of the total crosslinking component of the composition.

9. A blocked polyisocyanate crosslinking agent having at least one isocyanate group blocked with a hydroxy-functional morpholine dione monomer and the remaining isocyanate groups blocked with either said morpholine dione blocking agent, an ether alcohol, or an alkyl alcohol.

10. The blocked polyisocyanate crosslinking agent of claim 9 having the general formula:

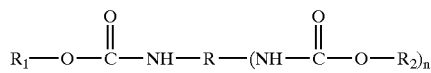

where R represents an aromatic, cycloaliphatic, or aliphatic hydrocarbon radical, $R_1$ is either a conventional polyisocyanate blocking agent such as an aliphatic monoalcohol, ether alcohol or $R_2$, $R_2$ is a morpholine dione radical represented by the formula:

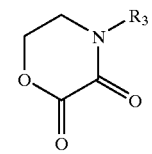

where $R_3$ is an alkyl group having 1–4 carbon atoms; and n is a positive integer from 1–4.

11. The crosslinking agent of claim 10 wherein R is an aromatic radical and n is 1.

12. A cathodic electrocoating method comprising:
 1) immersing a conductive substrate in a coating composition comprising, in aqueous medium:
  A) a crosslinkable resin having at least one acid-neutralized amine group, and
  B) a crosslinking agent having at least one isocyanate group blocked with a hydroxy-functional morpholine dione blocking agent,
 2) applying a potential of electric current between an anode and the conductive substrate until a coating of a desired thickness is electrodeposited on the conductive substrate, and
 3) removing the substrate from the coating composition.

* * * * *